United States Patent [19]

Rowen et al.

[11] Patent Number: 4,922,710
[45] Date of Patent: May 8, 1990

[54] INTEGRATED BOOST COMPRESSOR/GAS TURBINE CONTROL

[75] Inventors: William I. Rowen, Schenectady, N.Y.; David J. Withey, Loveland, Ohio

[73] Assignee: General Electric Company, Schenectady, N.Y.

[21] Appl. No.: 293,737

[22] Filed: Jan. 4, 1989

[51] Int. Cl.$^5$ .............................. F02C 3/22; F02C 9/26
[52] U.S. Cl. ................................ 60/39.281; 60/39.465
[58] Field of Search ........... 60/39.141, 39.281, 39.465, 60/734, 739

[56] References Cited

U.S. PATENT DOCUMENTS

| | | | |
|---|---|---|---|
| 2,625,784 | 1/1953 | Starkey | 60/39.281 |
| 2,687,273 | 8/1954 | Starkey | 60/39.281 |
| 3,104,524 | 9/1963 | Flanders | 60/39.281 |
| 3,805,519 | 4/1974 | Plotnick et al. | 60/39.281 |
| 4,087,961 | 5/1978 | Avery | 60/39.465 |
| 4,716,714 | 1/1988 | Takahashi et al. | 60/39.281 |

*Primary Examiner*—Louis J. Casaregola
*Attorney, Agent, or Firm*—Nixon & Vanderhye

[57] ABSTRACT

An integrated boost compressor/gas turbine control system is provided in which a fuel gas boost compressor boosts the fuel gas pressure before supplying the fuel gas to the gas turbine control valves, namely the stop/-speed ratio or pressure control valve and the gas control or volume valve, which in turn provide the fuel gas to the gas turbine. Pressure drops through these valves and hence boost power requirements are minimized by driving these valves to a fully open position under normal operating conditions, and using the valves in their normal control mode during other operating conditions such as start up and sudden load rejection. Thus, after startup operation, the system control is transitioned to the minimum system pressure drop of operation utilizing boost compressor flow control to control gas turbine fuel flow and hence gas turbine output power.

25 Claims, 4 Drawing Sheets

INTEGRATED BOOST COMPRESSOR/GAS TURBINE CONTROL

BACKGROUND OF INVENTION

This invention relates to a control system for a gas turbine having a fuel gas boost compressor to boost the fuel gas pressure before supplying the fuel gas to the turbine, and more particularly to a control system to control the combination of a gas boost compressor and gas turbine in such a manner as to meet the load demand with a minimum of power required to drive the fuel gas boost compressor.

The development and improvement of the gas turbine over the years has led to improved turbine performance utilizing increased mass flow, firing temperature and pressure ratio. This has led to the need for increased fuel gas supply pressure, and present day requirements are typically in the range of 275–325 PSIG (pounds per square inch), with higher pressures to as much as 400 to 600 PSIG required for current aero derivative engines and new heavy duty systems presently under development. While the fuel gas supply pressure requirements have been increasing the availability of fuel gas supplies at appropriate pressures has been decreasing. This in part due to the use of fuel gas other than natural gas, such as process gasses, which may be available at many industrial and cogeneration sites where gas turbines are used in the generation of electric power. These fuels are often available at very low, or in some instances, atmospheric pressure. This has led to the use of gas boost compressors which take the available fuel gas and boost its pressure to that required prior to supplying it to the gas turbine.

The required use of fuel gas boost compressors has added considerable cost to operation in addition, of course, to the initial cost of the equipment which may amount to 10 or 12 dollars per kilowatt of system power output for simple cycle units, and 20–25 dollars per kilowatt for dual redundant gas boost compressor installations. However, a second significant cost element for the system is the cost of operation of the gas boost compressors, that is the cost of the power necessary to drive the fuel gas boost compressor. This absorbed power reduces the net power plant output. The present invention cannot eliminate the need for a fuel gas boost compressor but it can significantly reduce the fuel gas boost compressor power consumption. An example of the fuel cost for a gas boost compressor may be calculated as follows: assuming four dollars per million BTU (British Thermal Units) and 8,000 hours of operation per year of the power plant with a normal gas boost compressor power requirement of 1200 Kilowatts, the annual equivalent fuel cost for the compressor power is $345,000. Even though the gas boost compressor fuel consumption is only 2–3 percent of the fuel gas requirement, an improved control system which could save up to 40 percent of the boost compressor fuel would result in considerable annual savings. Over the life of the generating plant, this can amount to millions of dollars.

OBJECTS AND SUMMARY OF INVENTION

It is an object of the present invention to provide an improved control system for an integrated fuel gas boost compressor/gas turbine system in which the power requirement for the gas boost compressor is decreased.

It is a further object of the present invention to significantly reduce the power requirements for the fuel gas boost compressor while providing fuel gas under optimum pressure to a gas turbine.

In carrying out the above and other objects of the present invention, there is provided in an integrated control system for a fuel gas boost compressor and gas turbine, a fuel gas boost compressor to boost the fuel gas pressure before supplying the fuel gas to the gas turbine through a stop/speed ratio or pressure control valve and the gas control or volume valve. Pressure drops through these valves are minimized, providing savings in system power requirements, by controlling these valves to a fully open position after the gas turbine is started, and during normal control operation. In this way the system control after startup is transitioned to minimum system pressure drop operation, utilizing gas boost compressor flow control during normal operating conditions.

The foregoing and other objects, features, and advantages of the present invention will become apparent from the following more particular description of a preferred embodiment of the invention, as illustrated in the accompanying drawings.

DESCRIPTION OF A PREFERRED EMBODIMENT

Figure 1:
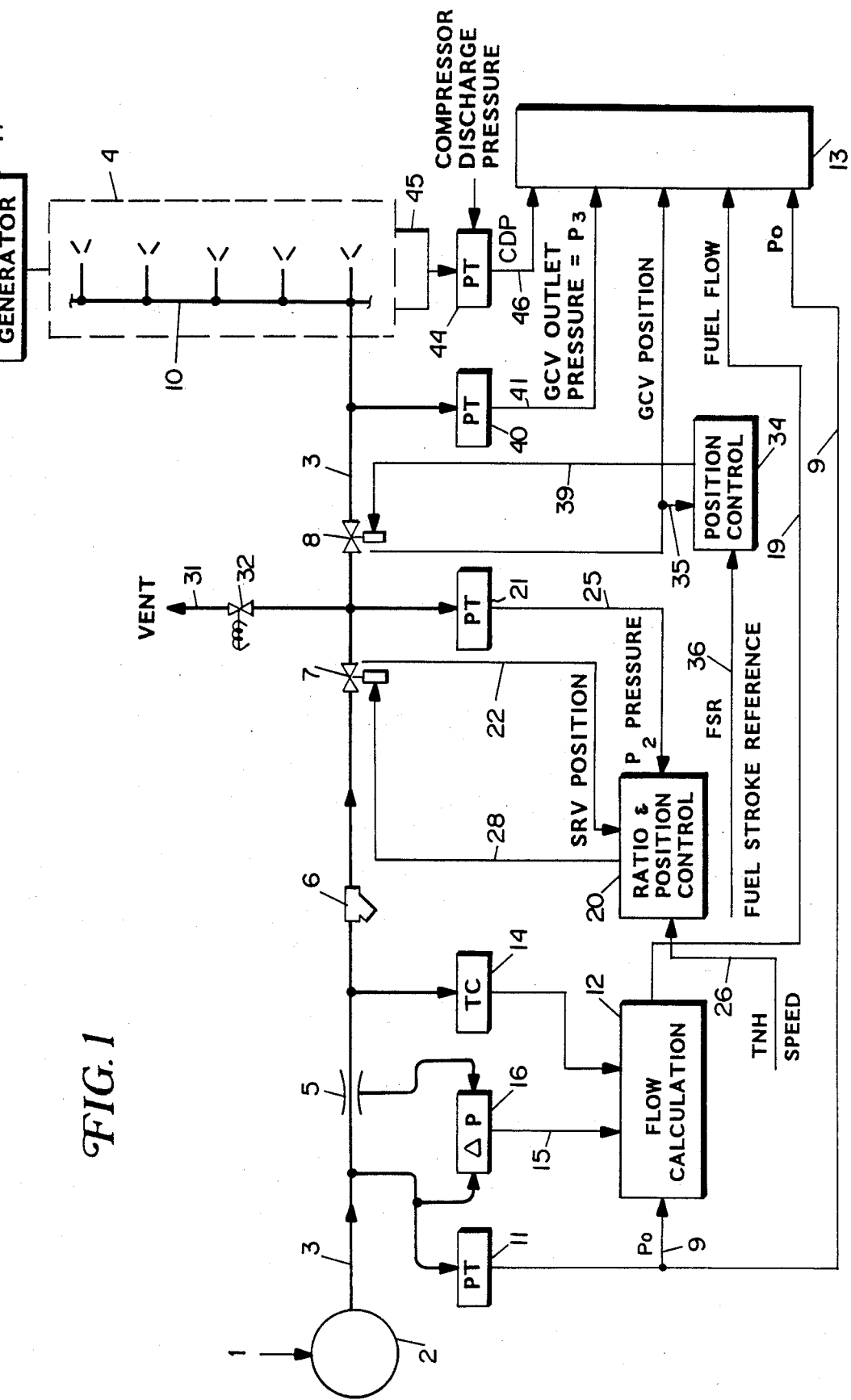
FIG. 1 is a schematic representation of a fuel gas control system in accordance with the present invention.

Referring to FIG. 1, there is shown schematically a fuel gas control system which includes a source of fuel gas 1 which may be natural gas, process gas, or refinery tail gas, which passes through the gas boost compressor 2 which supplies fuel gas to fuel gas line 3 which is at a pressure in excess of the range of 275–325 PSIG for controlled flow to the gas turbine shown generally as block 10. The pressure of the fuel gas 1 supplied by gas boost compressor 2 is provided at a constant pressure. The fuel gas control system of FIG. 1 reduces this pressure to a level which is a function of turbine speed as described below. The fuel gas 1 flows through flow meter 5 and strainer 6, stop/speed ratio valve 7 and gas control valve 8 before being delivered to the gas turbine manifold 10 of the gas turbine 4. The fuel meter 5 measures and provides a signal which is proportional to the fuel flow through the meter while the filter 6 is used to remove any solid contaminants remaining in the fuel gas 1 prior to providing the fuel gas to control valves 7 and 8. Pressure control of the fuel gas 1 supplied to gas turbine 4 is provided by the gas turbine stop/speed ratio valve as described in more detail below, while the actual gas flow of the gas at a predetermined pressure supplied by valve 7 to the gas turbine is controlled by the gas control valve 8. Since the fuel gas supplied to gas control valve 8 is at a predetermined constant pressure level, there is a linear relationship between the fuel gas flow rate and the position or stroke of the gas control valve 8.

The pressure transducer 11 positioned in fuel gas line 3 at the output of the gas boost compressor 2 and before the flow meter 5 supplies a fuel gas supply pressure signal (Po) 9 to the flow calculator 12 and also to the integrated fuel control 13. A thermocouple 14 is located after flow meter 5 in the fuel gas line 3 to provide a temperature signal to flow calculator 12 which is also provided with a pressure drop signal 15 from the differential pressure transducer 16 which represents the pressure drop across the flowmeter 5 such that the flow calculator 12 provides an actual mass fuel flow signal 19 to the integrated fuel control 13, taking into consideration variations in pressure and/or temperature in the fuel gas.

The ratio and position control circuit 20 receives signal 22 from the stop/speed ratio valve 7 representing the valve position, a pressure signal 25 from pressure transducer 21 located in fuel gas line 3 downstream of the valve 7, and the turbine speed signal 26. The signals are identified in FIG. 1 as the SRV position, P2 Pressure and TNH Speed signals, respectively. The pressure transducer 21 is downstream from the stop/speed ratio valve. The ratio and position control circuit 20 provides a command signal 28 for the stop/speed ratio valve position.

A vent 31 is connected through vent valve 32 to fuel gas line 3 to enable venting of the fuel gas when both control valves 7 and 8 are closed.

The position control circuit 34 is provided with signal 35 representing the position of the gas control valve 8 and a reference signal, the fuel stroke reference (FSR) signal 36, and provides a command signal 39 which is proportional to the difference between the gas control valve position signal 35 and the fuel stroke reference signal 36. The generation and use of the FSR signal is described below in connection with FIG. 2.

Figure 2:
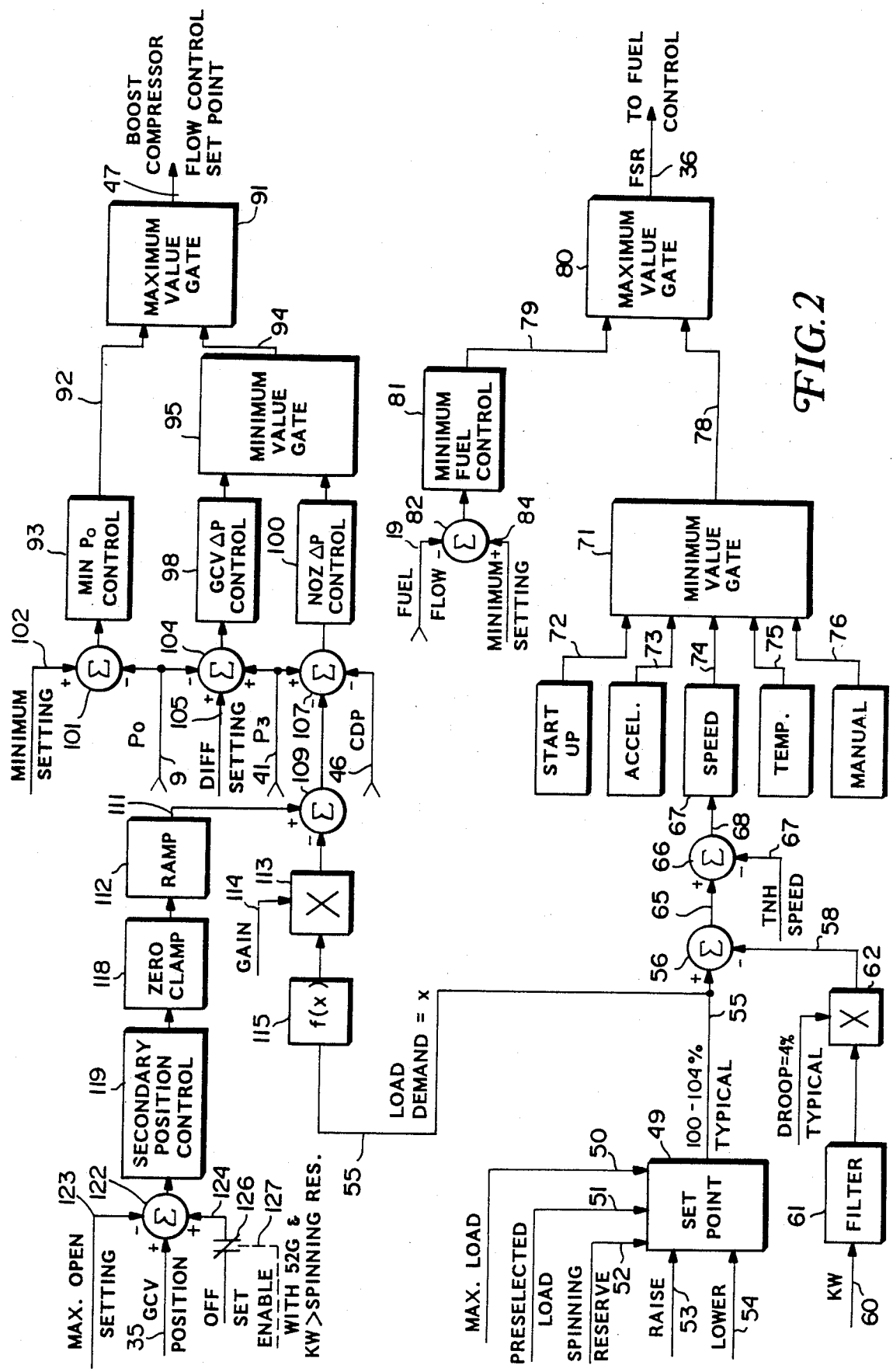
FIG. 2 is a block diagram of an integrated fuel gas boost compressor/gas turbine control system in accordance with the present invention.

The pressure transducer 40 provides a GCV outlet pressure or P3 signal 41 responsive to the outlet pressure of the gas control valve 8 to the integrated fuel control system 13 which is shown in detail in FIG. 2. The pressure transducer 44 provides CDP signal 46 responsive to the discharge pressure of the main air compressor or axial flow compressor 45 which provides the compressed air to the turbine 4 to support the turbine combustion.

It is to be noted that the fuel gas flow control system of FIG. 1 provides the following signals to the integrated fuel control system of FIG. 2: the compressor discharge pressure (CDP) 46, the gas control valve outlet pressure (P3) 41, the gas control valve position (GCV position) 35, fuel flow 19, and the fuel gas supply pressure (Po) 9.

Turning to FIG. 2, there is shown the integrated boost compressor/gas turbine control system in accordance with the present invention. Referring to FIG. 2, there is shown generally in the lower half, the control subsystem to develop the fuel stroke reference (FSR) signal 36 which is required in the control of gas control valve 8, while there is shown generally in the upper half, the control subsystem to develop the boost compressor flow control set point 47.

The set point circuit 49 receives a plurality of input signals such as maximum load 50, preselected load 51, spinning reserve 52, raise 53, and lower 54, and is adjusted to generate a signal 55 which is 100–104 per cent of a reference signal representing turbine speed which is provided to summing circuit 56. Also, supplied to the summing circuit 56 is a droop signal 58 which is subtracted from the set point signal 55. The droop signal 58 is developed by applying the power output signal (kilowatts) 60 of the generator 17 which is driven by the gas turbine 4, to the circuitry including filter 61 and multiplier 62 such that the droop signal is made proportional to the per unit power output or speed of the generator 17 divided by 25, that is, kilowatts/25 or 4% of the power output or speed. As a result, the output of summing circuit 56 is zero under normal conditions that is, if the set point signal 55 is 104%, and the electric power output of the generator 17 is 100 % divided by 25 or 4 % then the output 65 of summing circuit 56 is 100 %, which is applied to the second summing circuit 66 along with the turbine speed signal 67. If the circuits are adjusted to provide 100 % signal 65 and the turbine speed is also 100 % for full load, then the output 68 of the summing circuit 66 will be zero under normal conditions. In operation, when the system is operating at steady state, if the set point signal 55 is lowered to 103 %, the generator 17 has not yet changed its power output such that the output 65 of summing circuit 56 is now 103 %–4 % or 99 %. Since the gas turbine 4 has not slowed down, since system frequency is fixed, there is an error of −1 % which in effect "tells" the control system that there is too much fuel gas being supplied to the gas turbine 4. This reduces the FSR signal 36 which starts to close gas control valve 8 to reduce the fuel gas 3 supplied to gas turbine 4. As a result, the fuel input is reduced and the power generated by generator 17 goes down to 75 %, since 75 % of 4 % is 3 % at the output of multiplier 62.

The 3 % output of multiplier 62 is applied to summing circuit 56 and is subtracted from the 103 % signal 55, putting the governor loop back in balance. That is, the output of summing circuit 56 is 100 %, the turbine speed is 100 %, and the error or speed signal 67 provided by the second summing circuit 66 is zero, and the integrated error signal 74 is applied to the minimum value gate 71.

Various other control function signals such as start up 72, acceleration 73, temperature 75, and manual control 76, are provided as part of the minimum value gate 71 inputs. However, these are conventional control functions to control the fuel flow under various conditions and do not form part of the present invention. The minimum value gate 71 enables control by whatever requires the least fuel gas flow, whether this be, for example, speed or temperature. Thus, the minimum value gate 71 is provided with many inputs, and provides an output that requires the least fuel gas flow to satisfy the requirements.

The output signal 78 of the minimum value gate 71 is supplied to the maximum value gate 80. The other input to the maximum value gate 80 is a fuel control signal 79 provided by the minimum fuel control circuit 81 which responds to the fuel summing circuit 82 which receives two inputs, the fuel flow signal 19 and a minimum setting signal 84. The minimum setting signal 84 ensures that the gas turbine 4 receives at least the minimum fuel to keep the combuster ignited. Thus, the output of the maximum value gate 80 is the higher of the minimum fuel control signal 79 and the output 79 of the minimum value gate 71.

A discussion of the objectives and reasoning theory of the present invention is believed useful at this time in understanding the invention and the reasons for some of the control loops which will be discussed below. A principal object of the present invention is to control the gas boost compressor 2 so that it pumps only that flow required by the gas turbine 4 since any excess flow has to be bypassed or recirculated from the gas boost compressor discharge back to the suction side of the compressor. While this gas is recirculated, there is lost power and additional cost in such flow since the same gas must again be boosted through the gas boost compressor. Accordingly, the present invention controls the discharge pressure 9 of the gas boost compressor (Po) to the lowest value which is necessary to provide the fuel gas 1 required into the gas turbine 1. This objective can be seen in FIG. 4.

Figure 4:
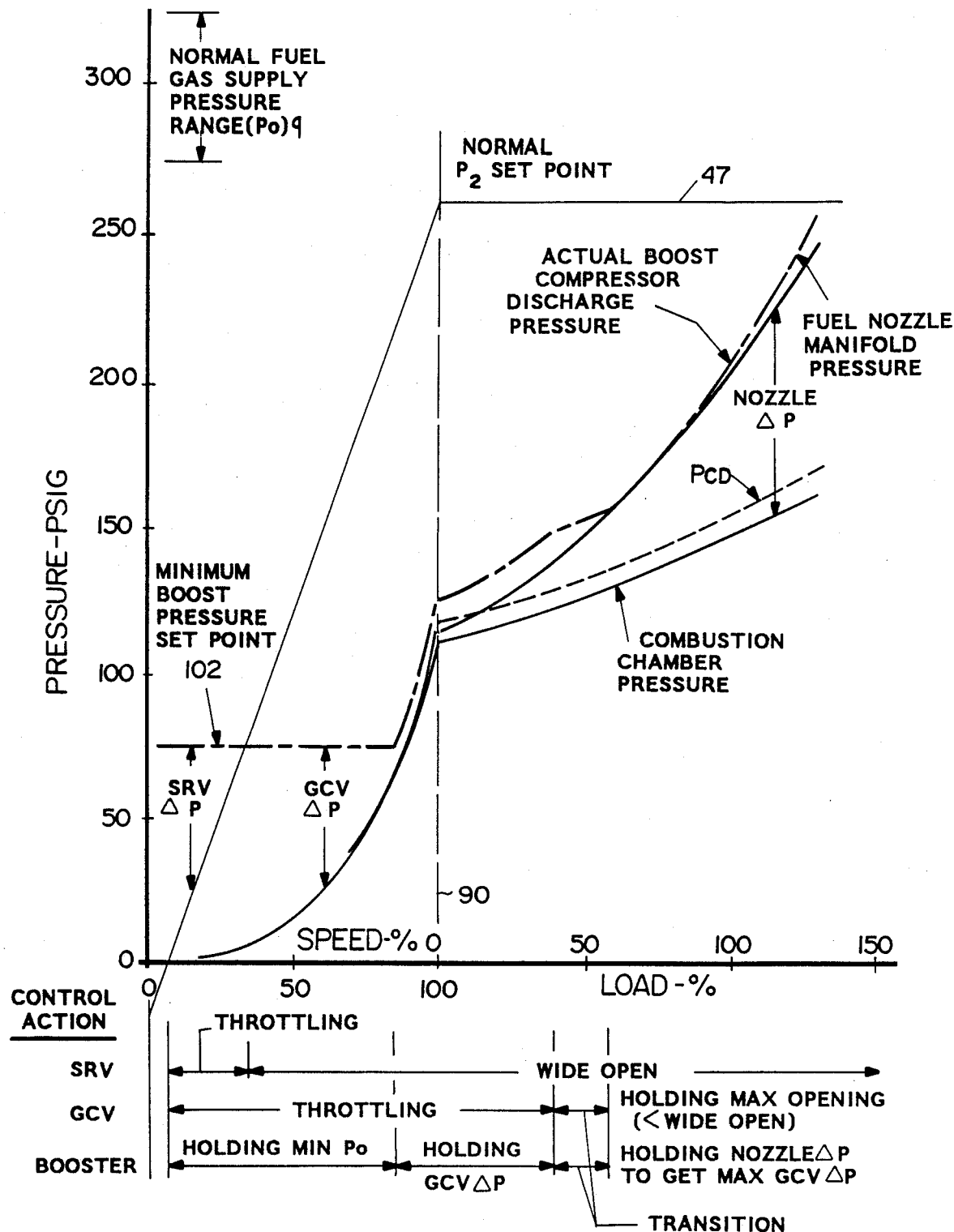
FIG. 4 is a graph showing the integrated fuel gas boost compressor/gas turbine control characteristics resulting from the present invention.

Referring to FIGS. 1 and 4, the integrated gas boost compressor system characteristic is set forth with pressure set forth on the y axis and speed and rated load (in per cent) set forth on the x axis, it being noted that speed is to the left of line 90, and load is to the right of line 90, with line 90 being 0 % for both speed and load. It is to be noted in the upper left of FIG. 4, that the normal range of the fuel gas supply pressure Po or 9 is approximately 275–325 PSIG for a typical gas turbine. This is what is required to get the fuel gas 1 to the combuster of the gas turbine 4 under conditions of maximum load and minimum ambient temperature. The combustion chamber pressure $P_3$ plus the nozzle pressure drop $\Delta P$ across the fuel nozzle is equal to the curve representing the pressure in the gas turbine manifold 10. The construction of a gas turbine manifold may include as many as 18 fuel nozzles extending outward on short pipes or pigtails (not shown) from the manifold pipe surrounding the gas turbine. The gas control valve 8 supplies fuel gas 3 to the manifold in the amounts necessary to maintain the required speed, temperature and load.

The fuel nozzle characteristics are those of a fixed orifice, such that the pressure drop required to provide fuel flow through the nozzle to the combuster is a squared relationship, that is:

$$P_D \text{ Nozzle} = C \times \text{flow}^2$$

where C is a constant.

In other words, the pressure in the manifold 10 is equal to the combustion chamber pressure plus the Nozzle differential pressure. This relationship is shown in the portion of FIG. 4 to the right of line 90. The fuel nozzle manifold pressure describes the pressure needed in the gas manifold to pass the load on the x axis into the gas turbine.

The pressure required to pass the fuel gas 1 from the gas boost compressor 2 to the gas turbine manifold 10, is that necessary to overcome the pressure drops across the stop/speed ratio valve 7, the gas control valve 8, the flow meter 5, and the interconnecting piping 3, and this would be the minimum pressure required.

The pressure drop across the gas control valve 8 and the stop/speed ratio valve 7 is variable, which is necessary in order to control the gas flow. The pressure drop across the speed ratio valve 7 and gas control valve 8 can be minimized by opening the valves up to provide the largest orifices therethrough. In this condition, with system gas flow being controlled by the boost compressor 2 flow control, the power required to drive the gas boost compressor 2 would be minimized and the boost compressor would pump only the gas needed for the turbine, that is the boost compressor need provide minimum discharge pressure with the valves in the wide open position. This relationship is utilized in the present invention wherein the stop/speed ratio valve 7 is controlled to the wide open position when not needed for control functions to avoid increasing the pressure drop across the valve, and to control the fuel gas flow through the gas boost compressor 2 to meet the load demand by controlling the flow through the boost compressor to control the throughput. Boost compressor flow can be economically controlled by throttling the compressor suction of a centrifugal compressor, varying the effective cylinder volume of a reciprocating compressor, or varying the speed of either type of compressor.

However, this raises a practical problem in that system flow control by the gas boost compressor 2 would result in significant volumes of stored gas in the control system. The stop/speed ratio valve 7 and gas control valve 8 are normally as close to the gas turbine 4 as possible to avoid stored energy in the system which would interfere with the responsive control required for the gas turbine to allow proper synchronization and the prevention of speed overshoot on sudden loss of load. Accordingly, if the point of fuel flow control were moved from the gas control valve 8, positioned close to the turbine 4, all the way back to the gas boost compressor 2, which could be in the order of 100 feet from the turbine, the stored energy between that point of control and the gas turbine will drastically increase.

Accordingly, the present invention provides a control system to effectively move the gas control valves out of the control loop during normal use, and utilizing their control action under control functions such as loss of load, synchronization of the gas turbine and emergency conditions such as shaft breakage where responsive control action is required.

During startup operation, the pressure required is low, and boost compressor power is saved as shown in FIG. 4. By controlling boost compressor flow to hold a minimum discharge pressure commensurate with avoiding a choked boost compressor condition, and controlling system flow with stop/speed ratio valve 7 and gas control valve 8, boost compressor power is held to a practical minimum.

In providing boost compressors for gas turbine applications, the flow set point is determined by the system flow rate required by the power demand placed on the gas turbine. This set point is the signal 47, which is the output of the maximum value gate 91 in FIG. 2, which compares the minimum pressure control signal 92 provided by the minimum Po control 93 with the output 94 of the minimum value gate 95. This prevents the boost compressor 2 pressure from reaching a value low enough in transient conditions to cause a flameout of the gas turbine 4 or choked operation of the boost compressor, that is, it provides a minimum fuel gas supply pressure for the gas turbine fuel control system.

The minimum value gate 95 compares the gas control valve pressure differential signal 98 and the nozzle pressure differential control signal 100. The minimum supply pressure control 93 input is provided by summing circuit 101, which compares the gas supply pressure ($P_o$) 9 which is the outlet pressure of the gas boost compressor 2, with a minimum desired pressure setting 102. The gas control valve pressure differential control 98 input is provided by summing circuit 104 which compares three inputs: the gas supply pressure Po signal 9, the gas control valve outlet pressure signal 41, which forms the gas control valve differential, and the desired pressure differential setting signal 105, which is a reference signal that can be set in the field to conform with the site requirements. The gas control valve pressure differential control 98 is not always in control, it is in control primarily for transient conditions and the minimum value gate 95 makes sure that the boost compressor flow control set point 47 is not so low as to cause a flow stoppage or flow reversal.

The primary control loop is provided by summing circuit 107 which compares the compressor discharge pressure 46 and the gas control valve outlet pressure 41, which forms the nozzle pressure differential with the output of summing circuit 109. Referring again to FIG. 4, the difference between the fuel nozzle manifold pressure P3, which is the gas control value pressure 41; and CDP which is the compressor discharge pressure 46 approximately follows the same shape as nozzle pressure differential, which is what is desired to be controlled as an indication of the pressure boost required from gas boost compressor 2. This then can be used as a feedback signal to make sure the right gas flow at the minimum supply pressure is provided. This approximation is a practical solution since it is extremely difficult to measure the combustion chamber pressure directly because of the very high temperatures a pressure sensor would encounter if placed within the combustion chamber. Accordingly, the CDP signal 46 is used as the fuel nozzle outlet pressure signal which is multiplied by 0.945. This coefficient is based on a calculation involving the geometry of the combustion chamber liner. P3 on the other hand, is directly measured by transducer 40 at the pipe upstream from the manifold but close enough such that it, in fact, represents manifold pressure.

Accordingly, it is possible to effectively control the system flow through the boost compressor flow control by commanding it to hold a nozzle pressure differential that corresponds to the square of the fuel flow required to meet the power demand placed on the gas turbine by the governor.

Referring to FIG. 2, the summing circuit 107 compares the difference between $P_3$, signal 41, and CDP signal 46 along with the output of summing circuit 109, which provides an input responsive to the set point signal 55, which is fed to summing circuit 109 through the function generating circuit 115 and the multiplier 113 which includes a gain control 114. The signal which determines the fuel flow to gas turbine 4, is the output signal of the set point of the governor, that is set point circuit 49. Since this is proportional to the demand or load placed on the gas turbine 4, it is proportional to the required fuel flow. The function generating circuit 115 provides the necessary constants to the control and also provides for nonlinearities. As a result, the required fuel gas is provided in terms of nozzle pressure differential, and this is the set point or reference for the nozzle pressure differential control 100.

The control system is intended to minimize the system pressure drop in order to minimize the gas boost compressor 2 power drop, and, as pointed out above, opening the stop/speed ratio valve 7 and gas control valve 8 will minimize the system pressure drop during normal system operation in accordance with the present invention.

Summing circuit 122 compares the position 35 of gas control valve 8 with a predetermined open setting 123 (95 % or 98 % for example). If the gas control valve position 35 is less than the predetermined setting, a signal is provided by the integrator within the secondary position control 119 through the zero clamp 118 and ramp function 112 to summing circuit 109 as signal 111. The zero clamp prevents a negative signal from reaching summing circuit 109, and the ramp function prevents signal 111 from changing too rapidly.

Summing circuit 109 subtracts signal 111 from the modified load demand signal, which is the output of multiplier 113. This causes the flow demand signal 47 to drop slightly, reducing gas turbine fuel flow and output power, to which the gas turbine governor responds by increasing the position 35 of the gas control valve 8. Simultaneously, the nozzle pressure differential control 100 senses the slight fuel flow reduction as a drop in nozzle pressure differential, and causes boost compressor flow control set point signal 47 to increase at the new gas control valve position. This process continues until the position 35 of the gas control valve 8 is at the predetermined open setting 123.

During startup and shutdown operation of the gas turbine 4, the system blocks out the effects of the secondary position control 119 in order that the gas control valve 8 can operate under transient conditions. An offset signal 124 is provided to summing circuit 122 to disable the entire secondary position control 119 by adding a bias voltage to drive the control signal into the region of the zero clamp 118. When the offset switch 126 is closed, this effectively pushes the entire secondary position control 119 to a condition where it is blocked by the zero clamp 118 such that it does not enter into the calculation of the fuel demand signal derived from load demand signal 55 (which is provided to summing circuit 109 through the function generator circuit 115 and multiplier 113. The offset switch 126 is closed whenever the main generator breaker (not shown) is open or when the megawatt output of the generator 17 is less than a predetermined amount, typically referred to as the spinning reserve power setting. Whenever the secondary position control 119 is blocked as described above, the gas control valve 8 functions in a convention manner.

By way of brief summary, the operation of the integrated boost compressor/gas turbine control system of the present invention may be described in somewhat simplified form as follows: during startup, the boost compressor flow control setpoint 47 is holding a minimum fuel gas booster compressor discharge pressure set point, while both the stop/speed ratio valve 7 and gas control valve 8 are throttling to maintain starting fuel flow. This continues until the gas control valve inlet pressure set point, which is a function of turbine speed 67, exceeds the gas boost compressor discharge pressure 9 ($P_o$). At this point the stop/speed ratio valve 7 integrates to the wide open position, and fuel flow control is accomplished exclusively using the gas control valve 8, in response to the speed and acceleration control. As the gas control valve outlet pressure 41 (P3) increases, the pressure drop across the gas control valve 8 will decrease until the gas control valve pressure drop reaches the gas control valve differential pressure setting 105 of the gas boost compressor flow control setpoint generator. At this point the flow from gas boost compressor 2 is modulated to maintain the gas control valve pressure drop 98 at the differential setting 105. Fuel flow control is accomplished under control or authority of the gas control valve 8. This mode of operation continues until the system is transitioned to the previously described minimum system pressure drop operation.

It is to be noted that the flow control of the gas boost compressor 2 is accomplished by three different operating levels of the system, which correspond to the signals provided by summing circuits 101, 104 and 107. These provide three basic pressure or pressure differential control loops. Summing circuit 101 establishes the minimum setting or floor for the gas boost compressor 2 outlet pressure, that is during startup or transients a minimum floor is established by summing circuit 101 in conjunction with the $P_o$ 9 signal, which is provided as one of the inputs to the value minimum Po control 93. Summing circuits 104 and 107 provide control signals to the valve gate 95 which allow the maximum value gate 91 to control system fuel gas flow by providing the reference for the boost compressor flow controller. When either of the summing circuits 107 or 104 require or call for increased as boost compressor discharge pressure which is greater than that called for by the minimum floor, the maximum value gate 91 allows control of the boost compressor flow control setpoint 47 to be turned over to the minimum value gate 95.

Figure 3:
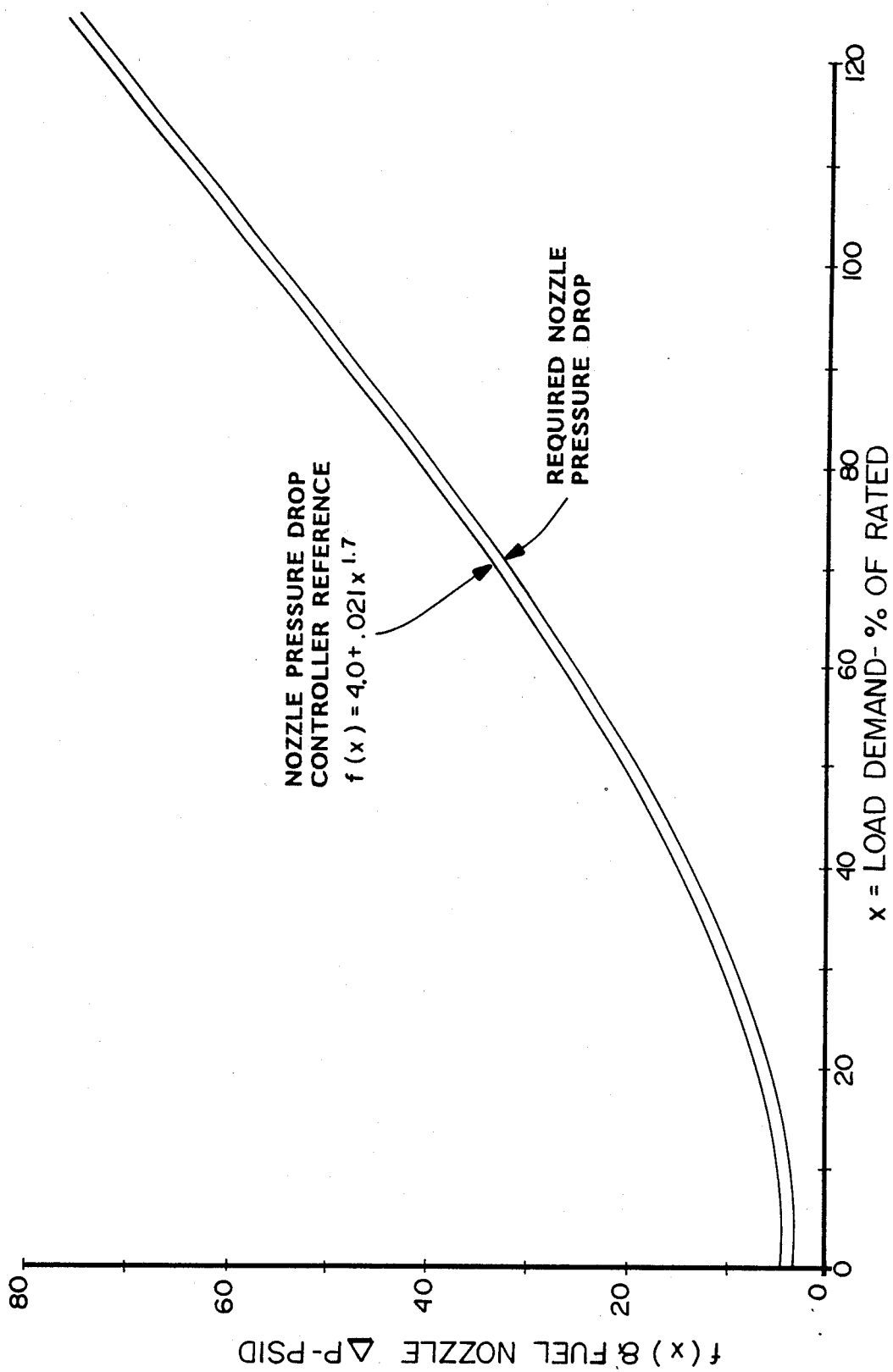
FIG. 3 is a graph of the fuel nozzle pressure drop control characteristics useful in explaining the operation of the present invention.

As the gas turbine 4 is loaded, the gas control valve pressure differential control 98 starts increasing to a level where the nozzle pressure differential control 100 function is coming up more rapidly, and the gas control valve pressure differential assumes the control function. Finally, the nozzle pressure differential control controls the boost compressor 2 gas flow to maintain the gas turbine manifold 10 pressure at a higher flow rate than the gas control valve differential pressure control 98 and continues to provide control in accordance with the modified load demand signal 53 which is a signal proportional to the function x2 as shown in FIG. 3. Referring to FIG. 3, it is seen that the nozzle pressure drop controller reference f(x) is equal to $4.0 + 0.021 \times 1.7$ and that as plotted against percent of rated load demand it follows quite closely the required pressure drop.

In order to provide minimum pressure drop across the gas control valve 8, the gas control valve is forced open as previously described, and this occurs because it is not open to the maximum level setting 123 called for by summing circuit 122.

What has been accomplished is a fuel control system incorporating a variable gain control valve, that is with the integrated boost compressor control of the present invention, it holds a variable pressure before the gas control valve 8 rather than a conventional constant pressure. That is, as pointed out above, with the stop/speed ratio valve 7 holding gas control valve inlet pressure, and neither valve fully open, control can be attained by varying the supply pressure to the gas control valve 8 at fixed gas control valve position 35, or by varying the gas control valve position at fixed supply pressure. In essence, the system is transitioned from a fixed pressure, variable position control during startup to a variable pressure, fixed position control during normal operation by effectively utilizing the gas control valve 8 as a variable gain control to minimize system pressure drops and therefore boost compressor discharge pressure and power.

The control system must also handle sudden load changes, although during normal operation load changes rarely occur quickly. Normally providing a raise command to setpoint circuit 49 causes the position 35 of the gas control valve 8 to increase from 95-98% which provides a slight increase in fuel gas flow to gas turbine 4. In addition, the load demand signal 55 increases, which calls for the gas nozzle boost compressor to increase flow to hold a new, higher differential pressure through controller 100 and this results in a rapid increase in all system pressures, gas flow, and turbine output.

A summary of the operation of the system upon increases in load is as follows: increases in load demand on the system are accomplished by two actions which occur simultaneously. The first is the normal speed governor action which opens the gas control valve 8 above the pre-established maximum open setting 123 of the secondary position control 119. The second action results from the load demand signal 55 causing an increase in the reference provided through summing circuit 109 to the nozzle differential pressure control 100.

Reductions in load demand result in the opposite sequence of events on a controlled basis.

If all the load is suddenly removed in an uncontrolled manner, the governor signal 74 calls for the gas control valve 8 to close rapidly, the load demand signal 55 is reduced far more rapidly than the response of the secondary position control 119 because of the ramp 112, which is also disenabled by offset signal 124 if the main generator breaker is opened or if the generator output drops below spinning reserve. The control system transitions back to a conventional system in which the position 35 of the gas control valve 8 is fixed. All of this happens rapidly enough to prevent overspeeding of the gas turbine 4. Thus, the response to sudden load rejection is accomplished initially through the normal speed control response, which sets the gas control valve 8 to a setting corresponding to the minimum flow setting required to maintain combustion in the gas turbine 4. In the present invention, the position of the gas control valve 8 is always under the authority of the speed control 67 and temperature control 75 to maintain satisfactory operating conditions of the gas turbine 4. This is accomplished by implementing the boost compressor 2 flow control as a variable gain changer to the normal fuel gas flow control system.

The overall system characteristics, and the control actions of the stop/speed ratio valve 7, the gas control valve 8, and the flow provided by the fuel gas booster compressor 2 as discussed above are shown in FIG. 4. The savings in fuel gas booster compressor input power is represented by the area between the heavy dotted curve and the normal fuel gas supply pressure Po of 275-325 PSIG. As pointed out above, these savings over the course of a year for a single installation are calculated to be approximately $350,000.

While the present invention has been described with respect to certain preferred embodiments thereof, it is to understood that numerous variations in the details of construction, the arrangement and combination of parts, and the type of materials used may be made without departing from the spirit and scope of the invention. In particular, the description has been couched in terms of hardwired analog circuits, but it is expressly understood that the implementation of the invention may be achieved by utilizing software and a digital controller.

What I claim is:

1. In an integrated boost compressor/gas turbine control system having a fuel gas boost compressor to boost the fuel gas pressure before supplying the fuel gas to the turbine comprising:

a first valve to control the pressure of said fuel gas supplied to said turbine;

a second valve to control the volume of said fuel gas supplied to said turbine; and means to control at least one of said first and second control valves to a substantially fully open position under normal operating conditions;

whereby the pressure of said fuel gas required to be delivered by said gas boost compressor is minimized during said normal operating conditions.

2. The control system of claim 1 wherein:

said first control valve controls the pressure of said fuel gas during startup of said gas turbine;

whereby normal throttling by said first control valve is eliminated during normal turbine operation.

3. The control system of claim 2 wherein said fuel gas passes serially through said first and second control valves.

4. The control system of claim 3 wherein said second control valve provides control of the fuel gas flow during substantially maximum load and minimum ambient conditions.

5. The control system of claim 4 wherein a flow meter is provided to maintain a minimum gas fuel flow to prevent blowout of the combustion of said gas turbine.

6. The control system of claim 5 wherein:

said gas turbine is used to drive an electric power generator;

a first signal is provided which is responsive to the power output of said generator;

a second signal is provided which is responsive to the setting of the speed governor of said gas turbine;

means to compare said first and second signals to provide a third signal to selectively provide a constant but settable droop characteristic for said speed governor; and said second signal being utilized as a reference signal for the control of said gas boost compressor to provide the required fuel flow.

7. The control system of claim 4 wherein said means to control at least one of said first and second control valves to a substantially fully open position comprises:

an inverting proportional plus integral secondary position control;

said secondary position control system calling for an output signal during startup which does not affect the flow control setpoint of said boost compressor;

means to remove an offset voltage to enable comparison of the position of said second control valve to a predetermined maximum opening setting; and means responsive to the removal of said offset voltage to open said second control valve.

8. The control system of claim 7 wherein said output signal during startup of said turbine is prevented from affecting said flow control setpoint through the action of an offset voltage and a zero clamp circuit.

9. The control system of claim 8 wherein the speed of response of said secondary position control is slowed by a ramp circuit during sudden transitions in load on said gas turbine.

10. The control system of claim 9 wherein the output of said secondary position control system is compared to a load demand signal as an input of a circuit which develops the flow control setpoint for said boost compressor.

11. The control system of claim 10 wherein said secondary position control is disabled during startup by adding a bias voltage to drive the control signal out of the way of said zero clamp.

12. The control system of claim 11 wherein a switch when actuated provides a negative signal which is blocked by said zero clamp to block said secondary position control.

13. The control system of claim 12 wherein said switch is actuated when the power output of a generator driven by said gas turbine is less than a predetermined amount.

14. The control system of claim 8 wherein control of said gas flow to said turbine is controlled by flow control of said gas boost compressor whenever said secondary position control is blocked.

15. The control system of claim 14 wherein said first and second control valves are throttled during startup of said gas turbine to maintain fuel gas flow required for startup.

16. The control system of claim 15 wherein said throttling continues until the inlet pressure of said second control valve exceeds the output pressure of said gas boost compressor.

17. The control system of claim 16 wherein said second control valve integrates to a substantially open position upon a deficiency of said inlet pressure.

18. The control system of claim 17 wherein said first control valve integrates to said substantially fully open position after said second control valve integrates to said substantially open position.

19. The control system of claim 18 wherein said first control valve is a stop/speed ratio valve.

20. The control system of claim 19 wherein said second control valve is a gas control valve.

21. The control system of claim 20 wherein the input signals to said secondary position control are provided through a summing circuit.

22. The control system of claim 10 wherein said comparison is provided through use of a second summing circuit.

23. The control system of claim 22 wherein said load demand signal is provided to said second summing circuit through a function circuit which provide necessary constants to the control and a multiplier.

24. The control system of claim 23 wherein said multiplier includes a gain control.

25. The control system of claim 2 wherein said system after startup transitions from a fixed pressure, variable position control to a variable pressure, fixed position control.

* * * * *

UNITED STATES PATENT AND TRADEMARK OFFICE
CERTIFICATE OF CORRECTION

PATENT NO. : 4,922,710
DATED : May 8, 1990
INVENTOR(S) : ROWEN et al.

It is certified that error appears in the above-identified patent and that said Letters Patent is hereby corrected as shown below:

Column 10, Claim 1, line 1, the first word of the claim "In" should be deleted and the second word "an" should be replaced by --An--.

Signed and Sealed this

Seventh Day of September, 1993

Attest:

BRUCE LEHMAN

*Attesting Officer*  *Commissioner of Patents and Trademarks*